(12) United States Patent
D'Aluisio

(10) Patent No.: US 8,066,104 B2
(45) Date of Patent: Nov. 29, 2011

(54) BICYCLE BRAKE ASSEMBLY

(75) Inventor: Christopher P. D'Aluisio, Corralitos, CA (US)

(73) Assignee: Specialized Bicycle Components, Inc., Morgan Hill, CA (US)

(*) Notice: Subject to any disclaimer, the term of this patent is extended or adjusted under 35 U.S.C. 154(b) by 511 days.

(21) Appl. No.: 12/407,635

(22) Filed: Mar. 19, 2009

(65) Prior Publication Data

US 2010/0236873 A1 Sep. 23, 2010

(51) Int. Cl.
*B62L 1/06* (2006.01)

(52) U.S. Cl. .................... 188/24.19; 188/24.22

(58) Field of Classification Search ............ 188/24.19, 188/24.22, 24.12, 24.11, 73.1
See application file for complete search history.

(56) References Cited

U.S. PATENT DOCUMENTS

| | | | |
|---|---|---|---|
| 4,546,858 A | 10/1985 | Nagano | |
| 4,597,474 A | 7/1986 | Nagano | |
| 4,768,623 A | 9/1988 | Nagano | |
| 4,896,750 A | 1/1990 | Tseng | |
| 5,099,958 A | 3/1992 | D'Aluisio | |
| 5,636,716 A | 6/1997 | Sugimoto et al. | |
| 5,655,630 A | 8/1997 | Sugimoto | |
| 5,960,913 A * | 10/1999 | Kuo | 188/24.19 |
| 6,032,766 A * | 3/2000 | Yang | 188/24.19 |
| 6,089,356 A | 7/2000 | Ohta et al. | |
| 6,607,057 B2 | 8/2003 | Lumpkin et al. | |

* cited by examiner

*Primary Examiner* — Melanie Torres Williams
(74) *Attorney, Agent, or Firm* — Knobbe Martens Olson & Bear LLP

(57) ABSTRACT

Various bicycle brake assemblies are described. In some embodiments, a bicycle brake assembly comprises a multi-lever linkage assembly comprising an input link and an output link coupled with a brake pad, wherein the multi-lever linkage assembly is configured to provide a greater mechanical advantage when the brake assembly is in a second activated position in which the brake pad is contacting a wheel than when the brake assembly is in a first unactivated position.

20 Claims, 5 Drawing Sheets

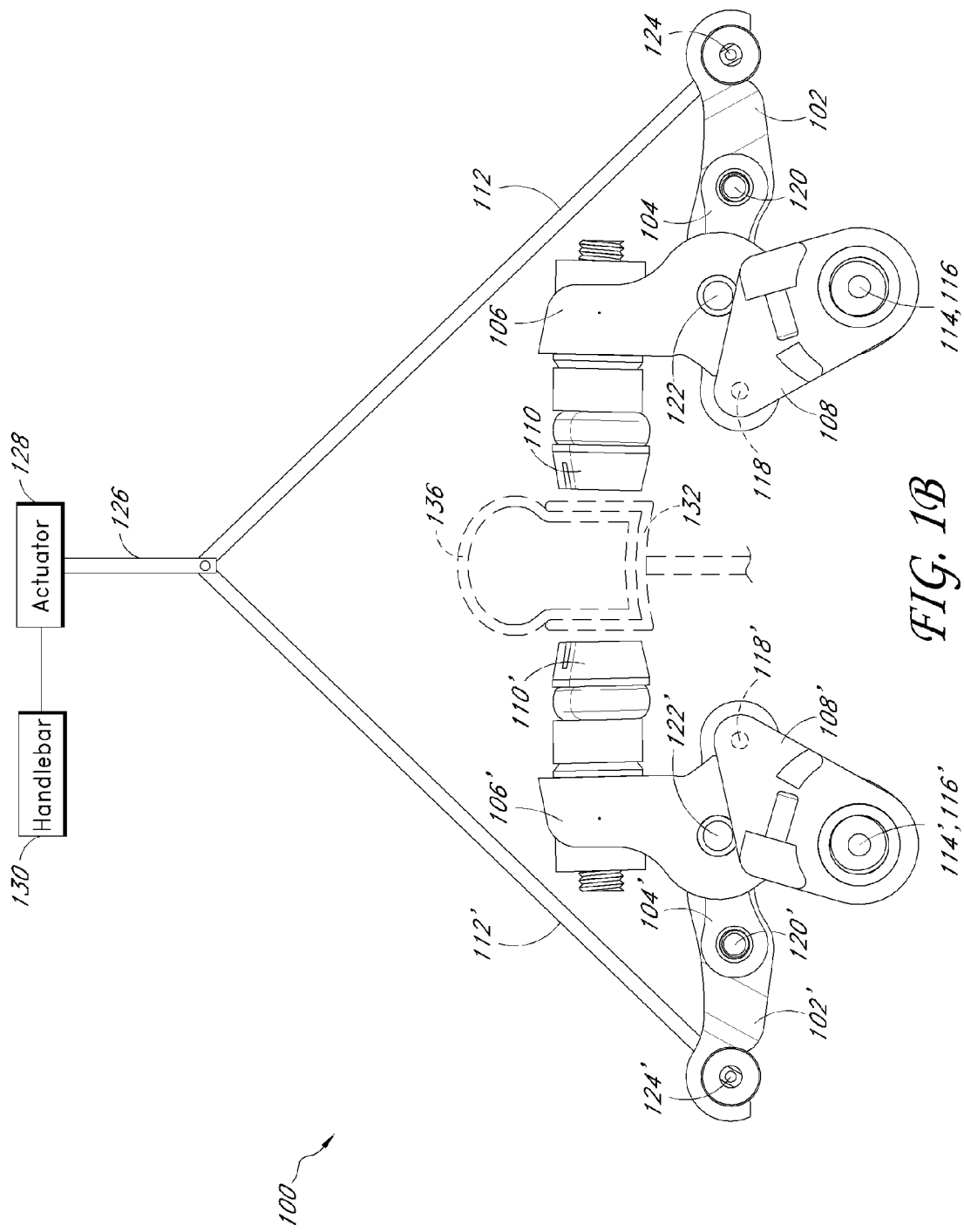

BICYCLE BRAKE ASSEMBLY

BACKGROUND OF THE INVENTION

1. Field of the Invention

This application relates to brake assemblies, and more particularly to bicycle brake assemblies.

2. Description of the Related Art

Various types of brakes for bicycles have been used. However, known units such as existing cantilever brakes and U-brakes have various limitations and disadvantages.

SUMMARY OF THE INVENTION

Example embodiments described herein have several features, no single one of which is indispensable or solely responsible for their desirable attributes. Without limiting the scope of the claims, some of the advantageous features will now be summarized.

In some embodiments, a bicycle brake assembly for applying a braking force to a wheel comprises a linkage assembly. The linkage assembly comprises an input lever and a brake arm, which includes a braking surface. The linkage assembly is configured to advance the braking surface toward the wheel in response to movement of the input lever, the linkage assembly being further configured to advance the braking surface toward the wheel at a greater distance per a given movement of the input lever for a first range of the movement of the input lever than for a second range of movement of the input lever. The brake assembly is configured such that the braking surface is closer to contacting the wheel during the second range of movement of the input lever than during the first range of movement of the input lever.

In some embodiments, a brake assembly for a bicycle comprises an input lever coupled to a brake cable at a first location, wherein the input lever is configured to pivot about a first pivot, and wherein an input line is defined by a line from the first location to the first pivot. The brake assembly further comprises a brake arm coupled to a brake pad and a toggle link pivotally coupled to the input lever at a second pivot and pivotally coupled to the brake arm at a third pivot, wherein a toggle line is defined by a line from the second pivot to the third pivot. The brake assembly is configured such that the input line is closer to parallel to the toggle line when the brake pad contacts a wheel than when the brake pad is spaced from the wheel.

In some embodiments, a bicycle brake assembly comprises a multi-lever linkage assembly comprising an input link and an output link coupled with a brake pad. The multi-lever linkage assembly is configured to provide a clearance between a wheel and the brake pad when the brake assembly is in a first unactivated position. The multi-lever linkage assembly is configured to provide a greater mechanical advantage when the brake assembly is in a second activated position in which the brake pad is contacting the wheel than when the brake assembly is in the first unactivated position, the mechanical advantage being proportional to the ratio of $\omega_{in}$ to $\omega_{out}$, wherein $\omega_{in}$ is the angular velocity of the input link and $\omega_{out}$ is the angular velocity of the output link.

The disclosure also includes methods of using and methods of manufacture of the systems and/or various components or combinations of components described above or elsewhere herein.

BRIEF DESCRIPTION OF THE DRAWINGS

These and other features, aspects and advantages of the inventions will be better understood with reference to embodiments illustrated in the accompanying drawings. The illustrated embodiments are not intended to define the limits or scope of the inventions.

FIG. 1B is a side view of an embodiment of a brake assembly.

DETAILED DESCRIPTION OF THE PREFERRED EMBODIMENTS

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

Figure 1A:
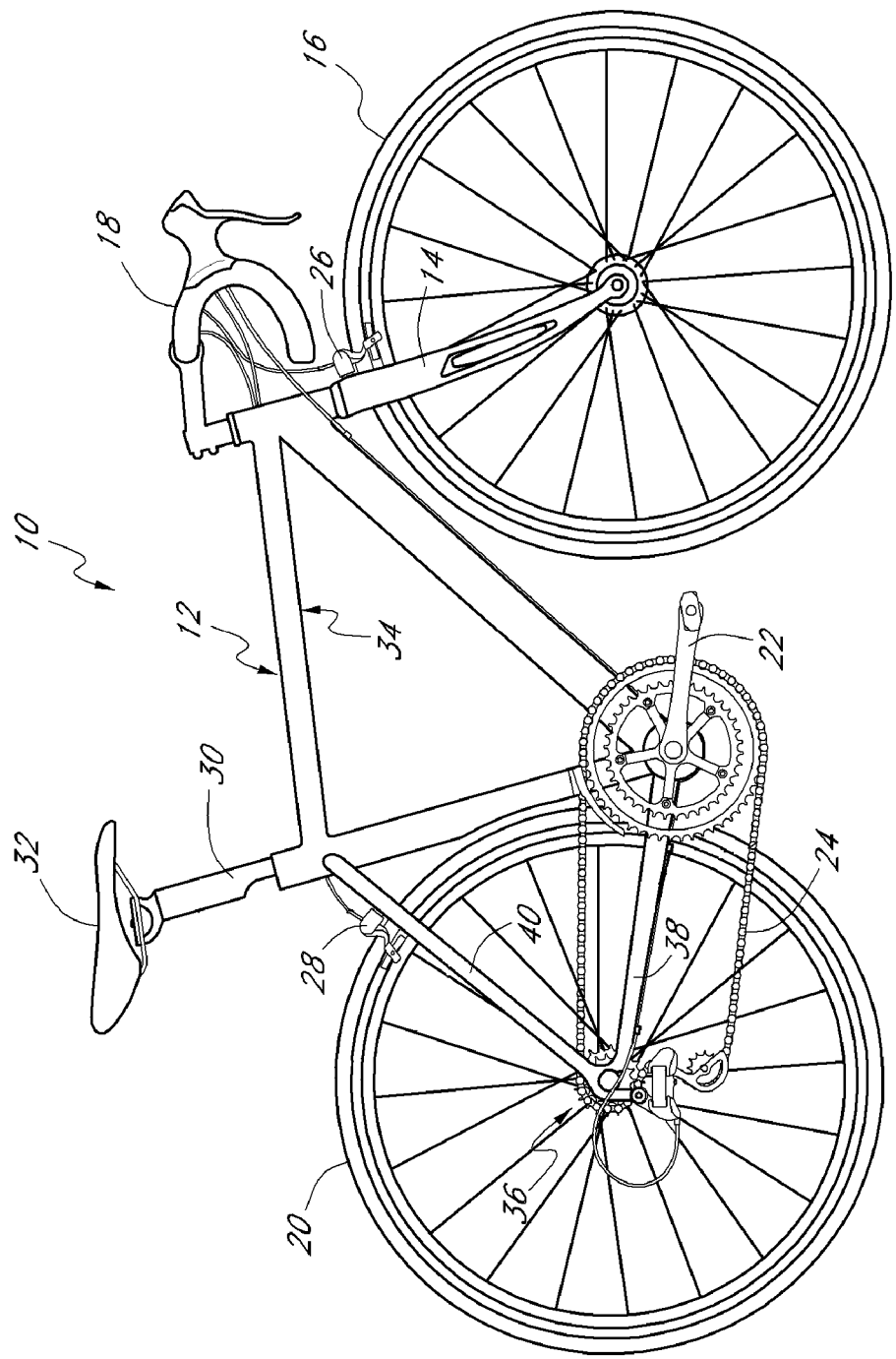
FIG. 1A is a side elevational view of an off-road bicycle, or mountain bike incorporating an embodiment of the brake assembly.

FIG. 1A illustrates a bicycle, which is referred to generally by the reference numeral 10. The bicycle 10 includes a frame 12, which rotatably supports a wheel support, or front fork assembly 14, near a forward end of the frame 12 for rotation about a steering axis. A lower end of the fork assembly 14 supports a front wheel 16 of the bicycle 10. A handlebar assembly 18 is connected to an upper end of the fork 14 for rotating the fork assembly 14 and front wheel 16 about the steering axis of the bicycle 10. In addition, the handlebar assembly 18 may include one or more rider controls, such as shifting or braking controls.

A rear wheel 20 of the bicycle 10 is supported near a rearward end of the frame 12. A pedal crank assembly 22 is rotatably supported by a lower portion of the frame 12. A drive chain 24 extends between the pedal crank assembly and the rear wheel to transfer power therebetween, as is well known in the art.

A front brake caliper 26 is supported by the front fork assembly 14 and is configured to selectively apply a squeezing force to a rim of the front wheel 16. Similarly, a rear brake caliper 28 is supported by the frame 12 and configured to selectively apply a squeezing force to a rim portion of the rear wheel 20. Embodiments of a brake assembly, which can include rear brake caliper 28, are discussed in greater detail below.

A seat post 30 extends in an upward direction from the frame 12 and supports a seat 32 on its upper end. The seat post 30 may be adjusted in height relative to the frame 12 to adjust a seat height of the bicycle 10.

Preferably, the frame 12 includes a main frame portion 34 and a wheel support, or rear frame portion 36. In some embodiments, the rear from portion 36 can be pivotally connected to the frame 12 and equipped with shock absorbers. The rear frame portion 36 desirably includes a pair of lower legs, or chain stay members 38 (only one shown), extending on each side of the rear wheel 20 from a lower portion of the main frame 34. In addition, the rear frame portion 36 includes a pair of upper legs, or seat stay members 40, extending from an upper portion of the main frame 34 on each side of the rear wheel 20 and being connected to a rear end of the chain stays 38 near a hub axis of the rear wheel 20.

Desirably, at least the main frame 34 is constructed from a plurality of tubular, metal pieces welded together. For example, the main frame 34 may be constructed from aluminum, steel or titanium tubing. Alternatively, the frame may comprise a composite material and may be constructed as a unitary piece. In addition, other suitable materials and/or construction methods may also be used, as will be appreciated by one of skill in the art.

FIG. 1B shows an embodiment of a brake assembly 100 that can be used to provide braking on a bicycle, such as bicycle 10 discussed with reference to FIG. 1A. As shown in FIG. 1B, the brake assembly 100 can comprise two halves, which can be symmetrical about a rim 132 (cross-section shown in phantom in FIG. 1B). The brake assembly can be actuated by actuator 128 (illustrated schematically in FIG. 1B), which can be mounted to a handlebar 130 (illustrated schematically in FIG. 1B). The brake assembly can include an input lever 102, 102', a toggle link 104, 104', a brake arm 106, 106', and an input base 108, 108'. The brake arm 106 can include a brake pad 110, 110'. The brake assembly can be controlled or activated via a brake cable 112, 112' pivotally coupled to the input lever 102, 102' at a cable pivot 124, 124'. The brake cable 112, 112' can be coupled to a center pull cable 126. The center pull cable can be coupled to actuator 128. The input lever 102, 102', toggle link 104, 104', brake arm 106, 106', and input base 108, 108' can be coupled to form a four-bar linkage system.

With further reference to FIG. 1B, the brake arm 106, 106' can be pivotally coupled to a reference component, which can be a bicycle frame, at an arm pivot 114, 114'. The input base 108, 108' can be pivotally coupled to the reference component at a base pivot 116, 116', which can be the same pivot location as the arm pivot 114, 114' as shown in FIG. 1B. The input base 108, 108' can be selectively pivotable about the base pivot 116, 116' to adjust the brake assembly 100 as discussed in detail further below. During normal operation, the input base 108, 108' can be fixed relative to the reference component to act as the ground link of the four-bar system. The input lever 102, 102' can be pivotally coupled to the input base 108, 108' at a lever pivot 118, 118'. The toggle link 104, 104' can be pivotally coupled to the input lever at a toggle input pivot 120, 120' and coupled to the brake arm 106, 106' at toggle output pivot 122, 122'. Movement of the brake cable 112, 112' can cause the input lever 102, 102' to pivot upward, and the toggle link 104, 104' can transfer an input force in the brake cable 112, 112' to an output force as the brake pad 110, 110' applies force to the rim 132 of the bicycle.

Two ends of the brake cable 112, 112' can be coupled to each input lever 102, 102' and the two ends can be joined at a center pull location so that the brake assembly is activated by a center pull cable 126. As the center pull cable is pulled by the actuator 128, the brake cable rotates each input lever 102, 102'. As the center pull cable 126 is actuated, the brake arm 110, 110' on each side of the brake assembly 100 desirably moves toward the rim 132 and then applies an opposing force to grip the rim 132 of the bicycle and slow movement of the wheel, which slows the bicycle through interaction of a tire 136 (cross-section shown in phantom in FIG. 1B) with a riding surface. For ease of description, only one half of the brake assembly is discussed in detail below.

Figure 2:
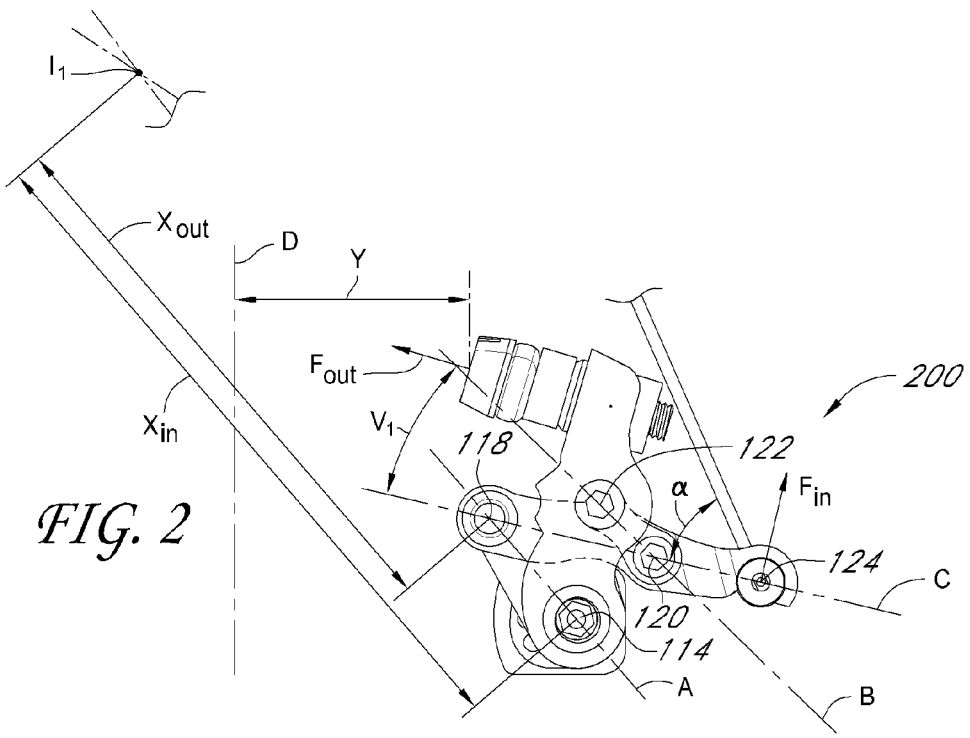
FIG. 2 is a side view of an embodiment of a brake assembly in a first position.

FIG. 2 shows one side of an embodiment of a brake assembly 200 in a first position at rest, in a zero center cable pull condition. A ground line A is shown intersecting the arm pivot 114 and lever pivot 118. A toggle line B is shown intersecting the toggle input pivot 120 and toggle output pivot 122. An input line C is shown intersecting the lever pivot 118 and the toggle input pivot 120. An angle between the toggle line B and the input line C is shown as angle $v_1$ in FIG. 2. In FIG. 2, this angle is the acute angle formed by lever pivot 118, toggle input pivot 120, and toggle output pivot 122. As shown in FIG. 2, an instant center $I_1$ is located at the intersection of ground line A and toggle line B. The distance from the arm pivot 114 to the instant center $I_1$ is a distance $x_{in}$. The distance from the lever pivot 118 to the instant center $I_1$ is a distance $x_{out}$. The instantaneous angular velocity ratio of the input lever 102 to the brake arm 106 is given by $x_{in}/x_{out}$. A point on brake pad 110 is a distance Y from a centerline D that can represent a midpoint of the rim 132 (not shown).

With further reference to FIG. 2, a cable angle $\alpha$ is shown between the brake cable 112 and the input line C, and is the acute angle between the cable 112 and input lever 102 closest to centerline D. In the embodiment illustrated in FIG. 2, as the center pull cable (not shown) is pulled, the cable angle $\alpha$ will increase. The increase in the angle $\alpha$ also has an effect on mechanical advantage. In some embodiments, the value of the cable angle $\alpha$ can be chosen to maximize mechanical advantage derived from the cable angle $\alpha$ at the point of full braking. Other mechanisms can be used to control the cable angle $\alpha$ during operation of the brake assembly to have desired effects on the mechanical advantage of the overall system during operation of the brake assembly. Other factors, such as the use of a particular brake lever, can be used to control the mechanical advantage of a bicycle brake. For ease of discussion, unless otherwise specified, mechanical advantage as discussed in the example embodiments below will refer to the mechanical advantage derived from the brake assembly itself, from an input force $F_{in}$ applied at an end of the input lever 102 where the brake cable 112 attaches to an output force $F_{out}$ at the brake pad, as shown in FIG. 2. Modification of cable angle $\alpha$ and specialized brake handles can be used to further increase performance independently or in conjunction with the bicycle brake assembly.

Various embodiments of the brake assembly 100 can provide high-power braking. In some embodiments, the lengths of each link and the relative locations of the pivots can be chosen to provide advantageous braking characteristics. In some embodiments, the mechanical advantage of the brake assembly is greater at a full brake position than at a zero cable pull position. The mechanical advantage of a system is defined as:

$$m_A = \frac{F_{out}}{F_{in}}, \quad \text{(Equation 1)}$$

where $m_A$ is mechanical advantage, $F_{out}$ is the output force, and $F_{in}$ is the input force. For a four-bar linkage (e.g., a ground link pivotally coupled to an input link and an output link, with a toggle link pivotally coupled between the input and output link) with zero losses (e.g., no friction at pivots), mechanical advantage can be shown to be:

$$m_A = \left(\frac{\omega_{in}}{\omega_{out}}\right)\frac{r_{in}}{r_{out}}, \quad \text{(Equation 2)}$$

where $\omega_{in}$ is the angular velocity of the input link, $\omega_{out}$ is the angular velocity of the output link, the input force $F_{in}$ is applied at an input radius $r_{in}$ perpendicular to the input force, and the output force $F_{out}$ is applied at an output radius $r_{out}$ perpendicular to the output force. While in reality losses will not be zero, they are often small and at any rate the equation serves as a helpful comparison of changes in mechanical advantage of a linkage system or differences in mechanical advantage between linkage systems. The angular velocity ratio $\omega_{in}/\omega_{out}$ can also be expressed as:

$$\frac{\omega_{in}}{\omega_{out}} = \frac{r_4 \sin\mu}{r_2 \sin v}, \quad \text{(Equation 3)}$$

where $r_2$ is the length of the input link (between pivots), $r_4$ is the length of the output link (between pivots), $\mu$ is the angle between the output link and the toggle link (also known as the transmission angle), and $v$ is the angle between the input link and the toggle link. For a given linkage system with a certain range of rotation, the value for $v$ or $\mu$ is generally the absolute value of the acute angles formed between extension lines of the respective links. As can be seen from Equations 2 and 3 above, the mechanical advantage of a four-bar linkage theoretically approaches infinity as the angle $v$ approaches zero, or as the input link and toggle link approach being parallel.

For a four-bar linkage system with a constant ratio of $r_{in}$ to $r_{out}$, the mechanical advantage is proportional to the ratio of the angular velocity of the input link to the angular velocity of the output link. The angular velocity ratio can be determined using instant center analysis. The instant center of the toggle link with respect to the ground link can be determined graphically by extending a line between the two pivots of the toggle link and determining where the line intersects another line defined by the two pivots of the ground link. This intersection point is an instant center, and can be denoted as I. The angular velocity ratio of the input link to the output link can be shown to be equal to the distance from I to the ground pivot of the output link divided by the distance from I to the ground pivot of the input link.

The mechanical advantage of an embodiment of a brake assembly 200 positioned as shown in FIG. 2 is given by $F_{out}/F_{in}$. As the brake assembly 200 is further actuated, the mechanical advantage will change. An example graphical analysis using instant centers and relative angular velocity ratios to determine a relative change in mechanical advantage is further discussed in detail below with reference to FIGS. 3 and 4.

Figure 3:
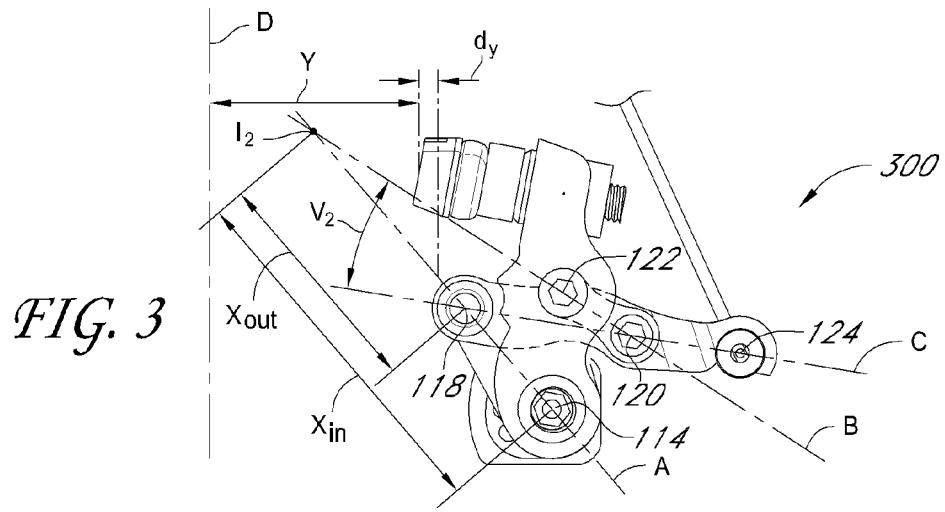
FIG. 3 is a side view of an embodiment of a brake assembly in a second position.

FIG. 3 shows an embodiment of a brake assembly 300 where the center pull cable has been pulled to move the brake assembly from its at rest position to a second or intermediate position. The center pull cable can be pulled from zero to a theoretical 100 percent, defining a maximum cable pull. The input lever 102 can also rotate from a starting reference position (corresponding to zero cable pull) to a final full braking position (corresponding to 100 percent cable pull), defining a maximum change in angle of the input lever 102. The position of the brake assembly 300 shown in FIG. 3 is between these two extremes and represents an intermediate position. For instance, an intermediate position could be a position in which the center pull cable has been pulled 50 percent, or half of the maximum cable pull. This position need not necessarily correspond to an intermediate position in which the input lever 102 has rotated half of the maximum change in angle of the input lever 102.

As can be seen in FIG. 3, the instant center has moved to a new location, designated as $I_2$. The brake pad 110 has moved closer to the rim, as shown by distance Y from the same point on brake pad 110 to the centerline D. The change in distance Y from position 1 in FIG. 2 to position 2 in FIG. 3 is shown as dY in FIG. 3, and represents brake pad travel. The toggle line B and input line C are closer to parallel in FIG. 3 than in FIG. 2, making the angle $v_2$ smaller than angle $v_1$ shown in FIG. 2. Likewise, $x_{in}$ and $x_{out}$ have decreased as compared to the position shown in FIG. 2, but the ratio of $x_{in}/x_{out}$ has increased. The increase in $x_{in}/x_{out}$ represents a proportional increase in $\omega_{in}/\omega_{out}$, or the angular velocity ratio of the input lever 102 to the brake arm 106. Thus, for a given movement of the input lever 102 from the position shown in FIG. 3 we will expect less movement from the brake arm 106 than we would have seen in response to the same movement of the input lever 102 from the position shown in FIG. 2. All other factors remaining constant, the mechanical advantage of the brake assembly 300 shown in FIG. 3 is greater than the mechanical advantage of the brake assembly 200 shown as positioned in FIG. 2.

Figure 4:
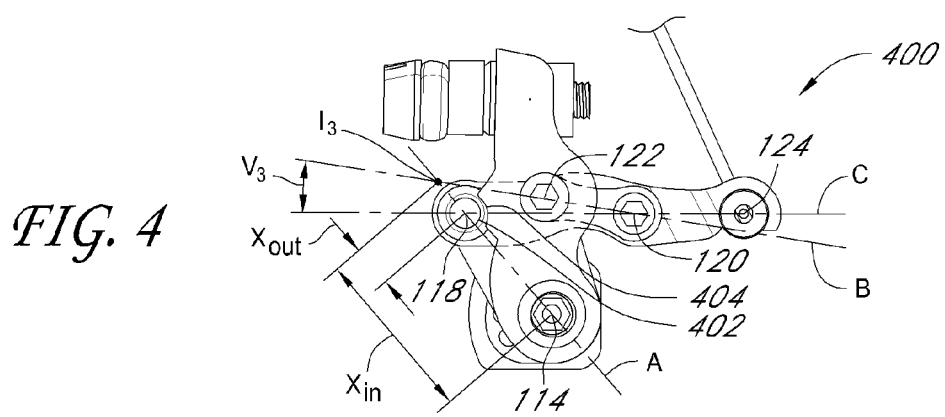
FIG. 4 is a side view of an embodiment of a brake assembly in a third position.

FIG. 4 shows an embodiment of a brake assembly 400 in a third position at or near 100 percent of center cable pull. Toggle line B and input line C are substantially parallel, as shown in FIG. 4, and toggle line B and input line C are closer to parallel than in the brake assembly 300 positioned as shown in FIG. 3. Accordingly, the angle $v_3$ is closer to zero, which tends to increase the mechanical advantage of the brake assembly 400 as compared to the brake assembly 200, 300 shown in FIGS. 2 and 3. As angle $v_3$ approaches zero, the mechanical advantage theoretically approaches infinity, which in practicality is limited by the strength of the links and pivots. Again, $x_{in}$ and $x_{out}$ have decreased as compared to the position shown in FIG. 3, but the ratio of $x_{in}/x_{out}$ has increased. The increase in $x_{in}/x_{out}$ represents a proportional increase in $\omega_{in}/\omega_{out}$, or the angular velocity ratio of the input lever 102 to the brake arm 106. Thus, for a given movement of the input lever 102 from the position shown in FIG. 4 we will expect less movement from the brake arm 106 than we would have seen in response to the same movement of the input lever 102 from the position shown in FIG. 3. All other factors remaining constant, the mechanical advantage of the brake assembly 400 shown in FIG. 4 is greater than the mechanical advantage of the brake assembly 300 shown as positioned in FIG. 3 and the mechanical advantage of the brake assembly 200 shown as positioned in FIG. 2.

As shown in FIG. 4, the brake assembly 400 can include a stop 402 that engages a stop surface 404 on the brake arm 106 to prevent the toggle link 104 and input lever 102 from becoming completely parallel and passing through a change point of the brake assembly linkage system. The stop 402 can be located concentric to the lever pivot 118 as shown in FIG.

4. In some embodiments, the brake assembly 400 can include other stop mechanisms instead of or in addition to stop 402. For example, a stop can be incorporated into arm pivot 114.

Embodiments of the brake assembly described herein have various desirable features. For example, in some embodiments the mechanical advantage is lower for at least a substantial portion of a first travel period (brake assembly travel from the first, at rest position to the second, intermediate position) than during a second travel period (from the second, intermediate position to the third, full braking position). Accordingly, the brake arm 106 will tend to move more in response to a given movement of the input lever 102 during the first travel period than during the second travel period. In some embodiments, a large movement of the brake arm 106 during the first travel period allows for a large amount of clearance as compared to at least some existing U-brakes. In some embodiments, prior to braking, a clearance between the rim and a closest point on the brake pad 110 is greater than about 2 mm, 4 mm, 6 mm, 8 mm, or 10 mm. Preferably, the initial clearance prior to braking is between about 2 and 10 mm, 4 and 8 mm, or 5 and 7 mm. Preferably, the initial clearance is about 2, 3, 4, 5, 6, 7, 8, 9, 10, 11, or 12 mm. The initial clearance can also be greater than a typical initial clearance on a U-brake. In some embodiments, the high mechanical advantage during the second travel period provides more braking force than at least some existing cantilever brakes. Additionally, road brake levers, such as those found on cross bikes, may not be designed to have the correct cable pull ratio to work with U-brakes, but cannot always transfer enough power through a cantilever brake to provide adequate braking. The brake assemblies described herein can be used with current state of the art road brake levers and provide adequate braking force. Variables such as cable length and configuration, linkage lengths, pivot positions, pad placement, and more can be manipulated to provide desired braking power and clearance.

In some embodiments, the first travel period corresponds to a change in angle of the input lever 102 of about one-half of the maximum change in angle. During the first travel period, the brake arm 106 can experience a change in angle that is greater than the change in angle of the brake arm 106 during the second travel period ending at or near the maximum change in angle of the input lever 102.

In some embodiments, there is a progressive ratio between brake pad travel and cable pull. For example, the starting ratio of brake pad travel to cable pull can be between about 1.75:1 and about 1.25:1 (or between about 1.7:1 and about 1.3:1, between about 1.6:1 and about 1.4:1, or about 1.4:1, about 1.45:1, about 1.5:1, about 1.55:1, or about 1.6:1 in some embodiments), with an ending ratio of brake pad travel to cable pull that can be between about 0.25:1 and 0.75:1 (or between about 0.3:1 and 0.7:1, between about 0.4:1 and 0.6:1, or about 0.4:1, about 0.45:1 about 0.5:1, about 0.55:1, or about 0.6:1). Preferably, the starting ratio of brake pad travel to cable pull is about 1.5:1 and the ending ratio of brake pad travel to cable pull is about 0.5:1. The starting ratio can correspond to the initial ratio when the cable starts to be pulled from the zero cable pull condition and the ending ratio can correspond to the final ratio as the cable is pulled to at or near 100 percent of cable pull.

In some embodiments, the center pull cable can be pulled from a reference position of zero percent to a theoretical one hundred percent. One hundred percent cable pull can correspond to a point at which the brake pad contacts the bicycle wheel, or a further point at which the two brake pads have been compressed against the bicycle wheel at maximum braking capacity. In some embodiments, when the center pull cable has been pulled from zero to about fifty percent, the brake pad moves approximately eighty percent (or between about 75 and about 85, between about 78 and about 82, or about 77, about 78, about 79, about 81, about 82, about 83, about 84, or about 85 percent in some embodiments) of its overall movement. As the center pull cable is pulled from about fifty percent to one hundred percent, the brake pad moves about twenty percent (or between about 25 and about 15, between about 22 and about 18, or about 15, about 16, about 17, about 18, about 19, about 21, about 22, or about 23 percent in some embodiments) of its overall movement. In some embodiments, a distance between a first point on a first brake pad 110 and a corresponding second point opposite the first point on a second brake pad 110 is between about 32-33 mm when the brake is open at zero center cable pull. When the center cable has been pulled about 7 mm, the distance between the first point and the second point is between about 22-23 mm. When the center cable has been pulled to a maximum of about 13 mm, the distance between the first point and the second point is between about 20-21 mm.

In some embodiments, an angular velocity ratio of the input lever 102 to the brake arm 106 is higher when the brake assembly is in a second position than in a first position. In some embodiments, the first position is characterized by a brake assembly in an at rest condition (e.g., as shown in FIG. 2), in which the angular velocity ration has an initial value. In some embodiments, the angular velocity ratio is about three times greater (or about 2.5, about 2.6, about 2.7, about 2.8, about 2.9, about 3.1, about 3.2, about 3.3, about 3.4, or about 3.5 in some embodiments) than the initial value when the brake assembly is in a second position. The second position may or may not correspond to a full-braking position of the brake assembly, (e.g., as shown in FIG. 4). In some embodiments, the angular velocity ratio of the input lever 102 to the brake arm 106 increases continuously as the brake assembly moves from a first position to a second position, which can correspond to an at-rest position and a full-braking position respectively. In some embodiments, the angular velocity ratio of the input lever 102 to the brake arm 106 increases from between about 1.0 and about 1.2 to between about 3.0 and 3.6 from the at rest condition shown in FIG. 2 to the full braking position shown in FIG. 4. Preferably, the angular velocity ratio of the input lever 102 to the brake arm 106 increases from about 1.1 to about 3.3 from the at rest condition shown in FIG. 2 to the full braking position shown in FIG. 4.

In some embodiments, a mechanical advantage of the brake assembly alone is defined as the ratio of an output force at the brake pad 110 (in a direction perpendicular to the brake arm 106) to an input force at the input lever 102 (in a direction perpendicular to the input lever 102). In some embodiments, the mechanical advantage increases by a factor of about three from the at rest condition shown in FIG. 2 to the full braking position shown in FIG. 4. In some embodiments, the mechanical advantage increases from between about 1.0 and about 1.2 to between about 3.0 and 3.6 from the at rest condition shown in FIG. 2 to the full braking position shown in FIG. 4. Preferably, the mechanical advantage increases from about 1.1 to about 3.3 from the at rest condition shown in FIG. 2 to the full braking position shown in FIG. 4.

Figure 5:
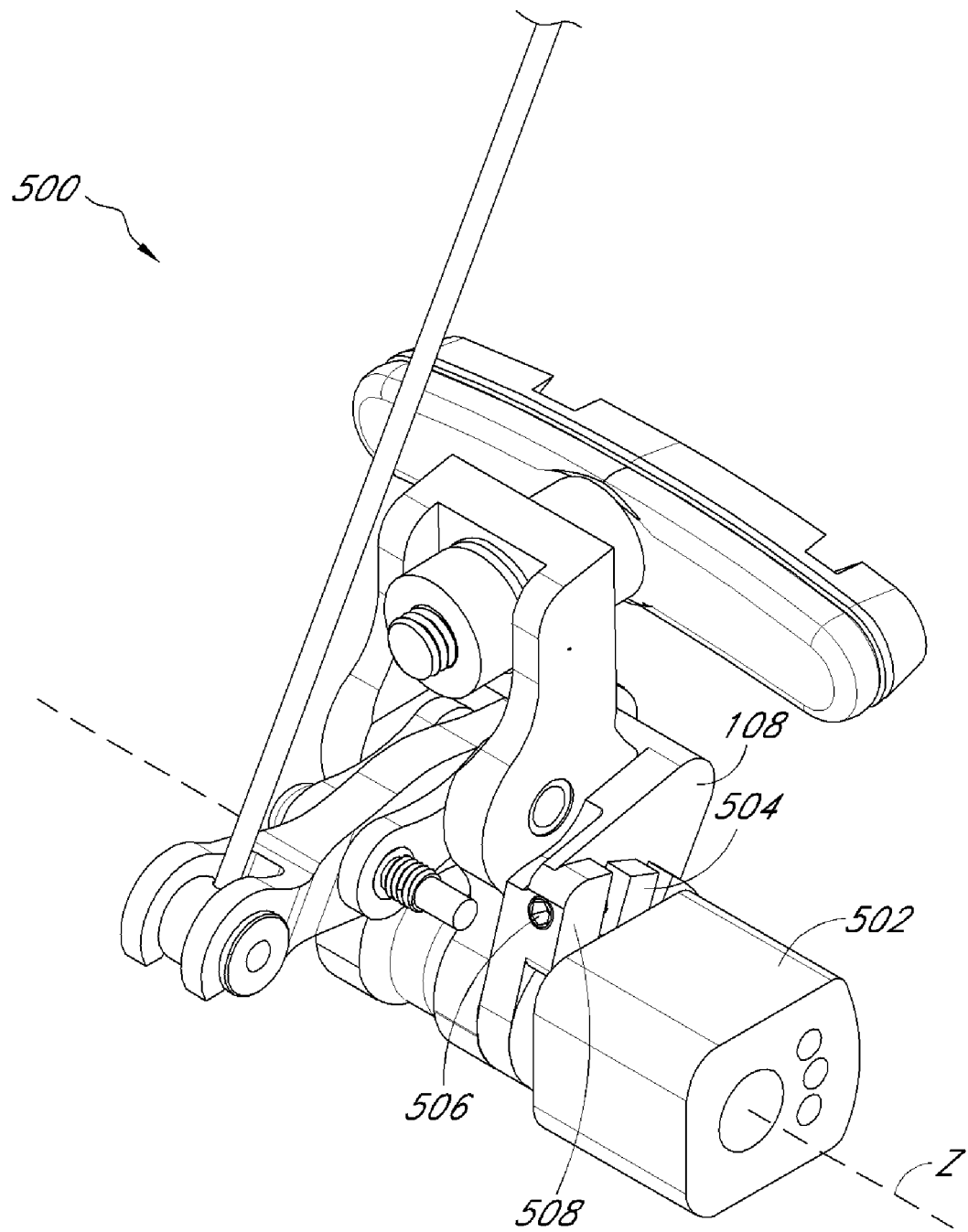
FIG. 5 is a perspective view of an embodiment of a brake assembly with an adjustable input base.

FIG. 5 shows an embodiment of a brake assembly 500 that is adjustable. A brake boss 502 is used to couple the input base 108 to the bicycle. The input base 108 is selectively pivotal about axis Z and relative to the brake boss 502. The angle of the input base 108 relative to the brake boss 502 can be adjusted by rotating a set screw 506 within an adjustment housing 508 of the input base 108. In some embodiments, the set screw 506 sets a maximum angle that the input base 108 can rotate toward the wheel. In some embodiments, the input base 108 can rotate when braking is first applied and then the input base 108 ceases rotation as the set screw contacts an adjustment surface 504 and is held against the adjustment surface 504 by pressure from the brake cable 112 on the brake assembly 500. In some embodiments, the set screw fixedly adjusts the input base 108 relative to the adjustment surface 504 so that the input base 108 does not rotate when braking. In some embodiments, the input base 108 or other components, including the entire brake assembly, is instead or additionally adjustable laterally toward or away from the rim or side to side along the rim. The input base 108 need not be pivotally adjustable at all, or in some embodiments the base pivot 116 about which the input base is pivotable is not concentric with the arm pivot 114. It can be desirable to allow the input base 108 to pivot in order to adjust for brake pad wear or for varying riding conditions or rider preferences. In some embodiments, the brake pad 110 is adjustable relative to the brake arm 106 instead of or in addition to adjustments of other components of the brake assembly 500, including the input base 108. Adjusting the input base 108 pivotally about the same axis as the brake arm 106 effectively allows for adjustment of the angle of the ground link of the linkage system. In some embodiments where the stop 402 is coupled to the input base 108 or lever pivot 118 the stop 402 can also pivot with the input base 108 to prevent the input lever 102 and toggle link 104 from passing through a change point.

Figure 6:
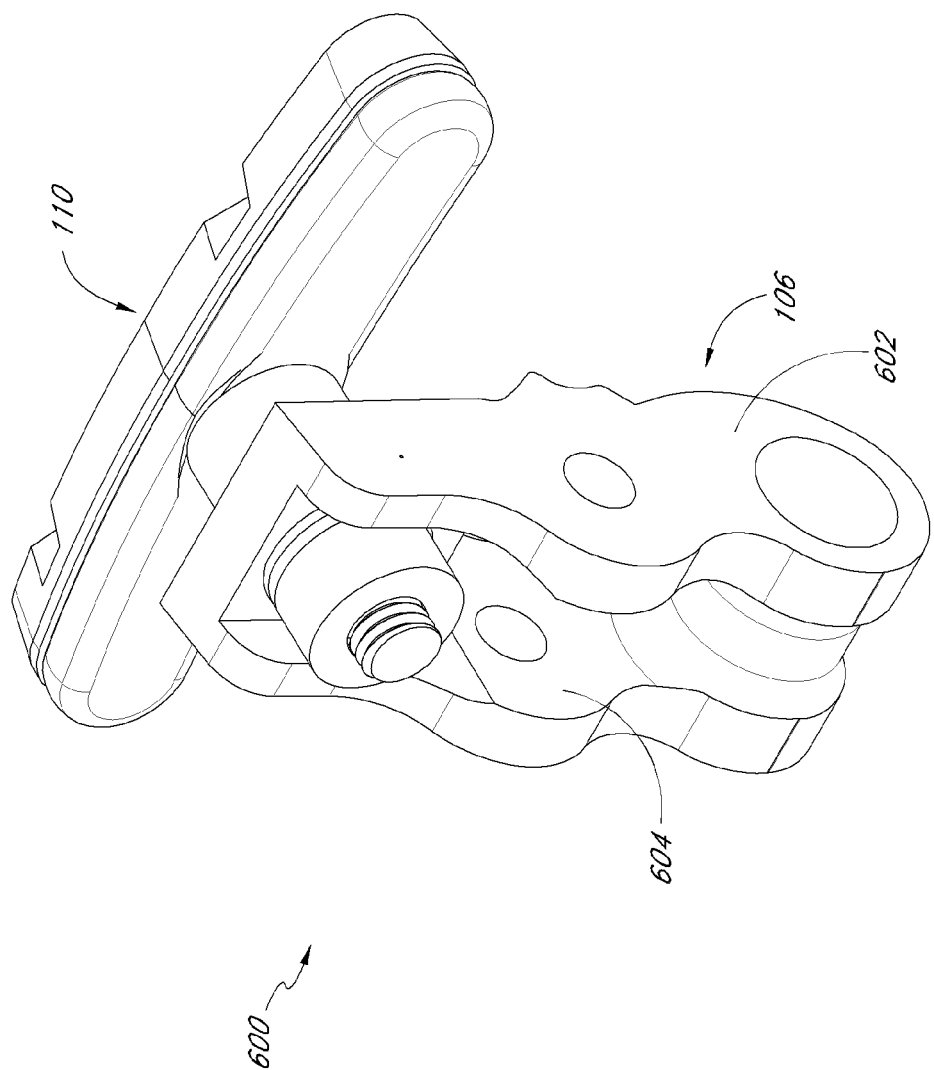
FIG. 6 is a perspective view of an embodiment of a brake arm assembly with multiple arms.

FIG. 6 shows an embodiment of a brake arm assembly 600 with multiple arms 602, 604. Multiple arms 602, 604 can add strength to the brake arm 106 and reduce play between one or more of the brake arm 106, the input lever 102, and the toggle link 104. Toggle link 104 can be located between multiple arms 602, 604 to provide a rigid surface on either side of toggle link 104 to limit torsional movement of toggle link 104. In some embodiments, the brake assembly can have other links such as toggle link 104 or input lever 102 that are integrally formed multiple levers similar to brake arm 106 shown in FIG. 6. Instead of or in addition to an integrally formed link with multiple arms, one or more links of the brake assembly can have multiple arms or levers that are separate and distinct pieces.

Reference throughout this specification to "some embodiments" or "an embodiment" means that a particular feature, structure or characteristic described in connection with the embodiment is included in at least some embodiments. Thus, appearances of the phrases "in some embodiments" or "in an embodiment" in various places throughout this specification are not necessarily all referring to the same embodiment and may refer to one or more of the same or different embodiments. Furthermore, the particular features, structures or characteristics may be combined in any suitable manner, as would be apparent to one of ordinary skill in the art from this disclosure, in one or more embodiments.

As used in this application, the terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Similarly, it should be appreciated that in the above description of embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that any claim require more features than are expressly recited in that claim. Rather, inventive aspects lie in a combination of fewer than all features of any single foregoing disclosed embodiment.

Although described in the illustrative context of certain preferred embodiments and examples, it will be understood by those skilled in the art that the disclosure extends beyond the specifically described embodiments to other alternative embodiments and/or uses and obvious modifications and equivalents. For example, fewer or additional links and/or levers can be used or arranged in different relationships. The brake assembly could also be actuated with a mechanism other than a center pull cable.

What is claimed is:

1. A bicycle brake assembly for applying a braking force to a wheel comprising:
    a linkage assembly comprising:
        an input lever; and
        a brake arm comprising a braking surface;
    wherein the linkage assembly is configured to advance the braking surface toward the wheel in response to movement of the input lever, the linkage assembly being further configured to advance the braking surface toward the wheel at a greater distance per a given movement of the input lever for a first range of the movement of the input lever than for a second range of movement of the input lever, wherein the brake assembly is configured such that the braking surface is closer to contacting the wheel during the second range of movement of the input lever than during the first range of movement of the input lever.

2. The bicycle brake assembly of claim 1, wherein a mechanical advantage of the linkage assembly is defined as a ratio of an output force and an input force, the output force acting at the braking surface in a direction perpendicular to a first pivot and a second pivot of the brake arm, the input force acting on the input lever in a direction perpendicular to a third pivot and a fourth pivot of the input lever, the linkage assembly configured to provide a greater mechanical advantage at a point in the second range of movement of the input lever than at a point in the first range of movement of the input lever.

3. The bicycle brake assembly of claim 1, wherein the input lever is configured to pivot about an input pivot location, and wherein the brake arm is configured to pivot about a brake arm pivot location, and
    wherein a ratio of an angular velocity of the input lever to an angular velocity of the brake arm is between about 1:1.25 and 1:1.75 towards the beginning of brake assembly travel and wherein the ratio is between about 1:0.25 and 1:0.75 towards the end of brake assembly travel as the braking surface approaches the wheel.

4. The brake assembly of claim 3, wherein the ratio of the angular velocity of the input lever to the angular velocity of the brake arm is about 1:1.5 towards the beginning of brake assembly travel and wherein the ratio is about 1:0.5 towards the end of brake assembly travel as the braking surface approaches the wheel.

5. The bicycle brake assembly of claim 1, wherein the braking assembly is configured such that, prior to braking, a clearance between the wheel and a closest point on the braking surface is greater than about 6 mm.

6. The bicycle brake assembly of claim 1, wherein the brake assembly is configured to be activated by pulling a cable coupled to the input lever, and wherein the braking surface contacts the wheel when the cable has been pulled a contact distance, and wherein the brake assembly is configured such that the braking surface moves a greater distance toward the wheel when the cable is pulled a first half of the contact distance than when the cable is pulled a second half of the contact distance.

7. The bicycle brake assembly of claim 1, wherein the input lever and the brake arm are coupled together by a toggle link.

8. The bicycle brake assembly of claim 7, wherein the toggle link is configured to move towards a parallel orientation with the input lever as the braking surface approaches the wheel.

9. The bicycle brake assembly of claim 7, further configured such that a rotational input of the input lever is transferred to the brake arm only through the toggle link.

10. The bicycle brake assembly of claim 8, wherein a stop is positioned to contact the linkage assembly to prevent the toggle link from becoming completely parallel to the input lever.

11. The bicycle brake assembly of claim 10, wherein the input lever is configured to pivot about an input pivot axis, and wherein the stop is positioned along the input pivot axis, and wherein the input pivot axis is selectively moveable.

12. The bicycle brake assembly of claim 11, wherein the brake arm is configured to pivot about a brake arm pivot axis, and wherein a ground link extends between the brake arm pivot axis and the input pivot axis, and wherein the ground link is pivotally adjustable about one of the brake arm pivot axis and the input pivot axis.

13. A brake assembly for a bicycle comprising:
an input lever coupled to a brake cable at a first location, wherein the input lever is configured to pivot about a first pivot, and wherein an input line is defined by a line from the first location to the first pivot;
a brake arm coupled to a brake pad; and
a toggle link pivotally coupled to the input lever at a second pivot and pivotally coupled to the brake arm at a third pivot, wherein a toggle line is defined by a line from the second pivot to the third pivot;
wherein the brake assembly is configured such that the input line is closer to parallel to the toggle line when the brake pad contacts a wheel than when the brake pad is spaced from the wheel.

14. The brake assembly of claim 13, wherein the brake assembly is configured such that the input line and the toggle line are substantially parallel when the brake pad contacts the wheel.

15. The brake assembly of claim 13, wherein the brake arm pivots about a fourth pivot, and wherein a brake arm line is defined by a line from the fourth pivot to the third pivot, and wherein the brake assembly is configured such that the brake arm line is substantially perpendicular to the input line when the brake pad contacts the wheel.

16. A bicycle brake assembly comprising:
a multi-lever linkage assembly comprising:
an input link; and
an output link coupled with a brake pad;
wherein the multi-lever linkage assembly is configured to provide a clearance between a wheel and the brake pad when the brake assembly is in a first unactivated position; and
wherein the multi-lever linkage assembly is configured to provide a greater mechanical advantage when the brake assembly is in a second activated position in which the brake pad is contacting the wheel than when the brake assembly is in the first unactivated position, the mechanical advantage being proportional to the ratio of $\omega_{in}$ to $\omega_{out}$, wherein $\omega_{in}$ is the angular velocity of the input link and $\omega_{out}$ is the angular velocity of the output link.

17. The bicycle brake assembly of claim 16, wherein the linkage assembly is configured to increase the ratio of $\omega_{in}$ to $\omega_{out}$ by a factor of about three from the first unactivated position to the second activated position.

18. The bicycle brake assembly of claim 17, wherein the linkage assembly is configured to increase the ratio of $\omega_{in}$ to $\omega_{out}$ from about 1.1 to about 3.3 from the first unactivated position to the second activated position.

19. The bicycle brake assembly of claim 17, wherein the multi-lever linkage assembly is configured to increase the mechanical advantage by about a factor of three from the first unactivated position to the second activated position.

20. The bicycle brake assembly of claim 16, wherein the multi-lever linkage assembly is configured to provide a higher mechanical advantage when the brake pad is contacting the wheel than during the rest of brake pad travel.

\* \* \* \* \*